(12) United States Patent
Hoshi et al.

(10) Patent No.: US 9,512,335 B2
(45) Date of Patent: Dec. 6, 2016

(54) ADHESIVE SHEET AND BONDING METHOD USING THE SAME

(75) Inventors: Kentaro Hoshi, Kawaguchi (JP);
Junichi Kuroki, Saitama (JP);
Takayuki Ueki, Kashiwa (JP);
Takahisa Taniguchi, Tokyo-to (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 369 days.

(21) Appl. No.: 13/521,097

(22) PCT Filed: Jan. 7, 2011

(86) PCT No.: PCT/JP2011/050152
§ 371 (c)(1),
(2), (4) Date: Jul. 30, 2012

(87) PCT Pub. No.: WO2011/083835
PCT Pub. Date: Jul. 14, 2011

(65) Prior Publication Data
US 2012/0288659 A1 Nov. 15, 2012

(30) Foreign Application Priority Data

Jan. 8, 2010 (JP) .................................... 2010-2838
Aug. 6, 2010 (JP) ................................ 2010-177854
Sep. 29, 2010 (JP) ................................ 2010-219003

(51) Int. Cl.
*B32B 37/12* (2006.01)
*B32B 33/00* (2006.01)
(Continued)

(52) U.S. Cl.
CPC *C09J 7/00* (2013.01); *C09J 7/041* (2013.01); *C09J 133/20* (2013.01); *C09J 163/00* (2013.01); *C09J 163/08* (2013.01); *C08K 5/0025* (2013.01); *C08K 5/3155* (2013.01); *C09J 2201/128* (2013.01); *C09J 2201/606* (2013.01); *C09J 2201/61* (2013.01); *C09J 2205/102* (2013.01); *C09J 2433/00* (2013.01);
(Continued)

(58) Field of Classification Search
None
See application file for complete search history.

(56) References Cited

U.S. PATENT DOCUMENTS 4,199,646 A * 4/1980 Hori et al. ..................... 428/344
4,588,827 A  5/1986 Mueller et al.
(Continued)

FOREIGN PATENT DOCUMENTS

EP 0 971 011 A2 1/2000
JP 63-193980 A1 8/1988
(Continued)

OTHER PUBLICATIONS

Machine translation of JP05156229 (1993).*
(Continued)

*Primary Examiner* — Alexandre Ferre
(74) *Attorney, Agent, or Firm* — Burr & Brown, PLLC (57) ABSTRACT

There is provided an adhesive sheet that has initial adhesiveness, can realize bonding between metals, between a metal and an organic material, and between organic materials, and can retain an excellent adhesion strength without undergoing a temperature change. The adhesive sheet comprises a first release paper, an adhesive layer, and a second release paper stacked in that order, the adhesive layer containing an adhesive, the adhesive containing at least an acrylic resin, an epoxy resin, and a curing agent, the content of the epoxy resin being 175 to 300 parts by weight per 100 parts by weight of the acrylic resin.

10 Claims, 7 Drawing Sheets

(51) Int. Cl.
*C09J 7/00* (2006.01)
*C09J 133/20* (2006.01)
*C09J 163/00* (2006.01)
*C09J 163/08* (2006.01)
*C09J 7/04* (2006.01)
*C08K 5/00* (2006.01)
*C08K 5/315* (2006.01)

(52) U.S. Cl.
CPC ...... *C09J 2463/00* (2013.01); *Y10T 428/1476* (2015.01); *Y10T 428/24612* (2015.01)

(56) References Cited

U.S. PATENT DOCUMENTS

| | | | |
|---|---|---|---|
| 5,965,269 A * | 10/1999 | Inada et al. | 428/413 |
| 7,557,168 B2 * | 7/2009 | Lutz et al. | 525/454 |
| 7,578,891 B2 * | 8/2009 | Ookubo et al. | 148/33.3 |
| 2003/0159773 A1 * | 8/2003 | Tomiyama | C09J 7/00 156/248 |

FOREIGN PATENT DOCUMENTS

| | | | |
|---|---|---|---|
| JP | 63-309575 A1 | 12/1988 | |
| JP | 04-209686 A1 | 7/1992 | |
| JP | 05156229 A * | 6/1993 | |
| JP | 08-067858 A1 | 3/1996 | |
| JP | 09-181421 A1 | 7/1997 | |
| JP | 10-183086 A1 | 7/1998 | |
| JP | 10-316957 A1 | 12/1998 | |
| JP | 11-021536 A1 | 1/1999 | |
| JP | 2005-085827 A1 | 3/2005 | |
| JP | 2005-154687 A1 | 6/2005 | |
| JP | 2005150421 A * | 6/2005 | |
| JP | 2006-237483 A1 | 9/2006 | |
| JP | 2010-270285 A1 | 12/2010 | |
| WO | 2009/075472 A1 | 6/2009 | |

OTHER PUBLICATIONS

Machine translation of JP2005150421 (2005).*
International Search Report dated Mar. 8, 2011 (with English translation).
Extended European Search Report (Application No. 11731833.7) dated Jan. 31, 2014.
Japanese Office Action (Application No. 2010-219003) dated Jul. 4, 2014 (with English translation).
European Office Action (Application No. 11731833.7) dated Oct. 17, 2014.

* cited by examiner

Example

Example 4

Example 3

Example 5

FIG. 3

Comparative Example 2

FIG. 4

(a) Before Breaking (b) After Breaking

ADHESIVE SHEET AND BONDING METHOD USING THE SAME

BACKGROUND OF THE INVENTION

Field of the Invention

The present invention relates to an adhesive sheet and more specifically relates to an adhesive sheet that can realize bonding between metals, between a metal and an organic material, and between organic materials, has a good adhesiveness even before curing, and can retain an excellent adhesion strength without undergoing a temperature change after curing.

Description of Related Art

Conventional bonding methods for integration of two adherends include bonding by biting, welding, and bonding with an adhesive agent or a pressure-sensitive adhesive agent that are heavily used in respective suitable fields depending upon applications. In recent years, in applications associated with transportations such as automobiles, a weight reduction in car bodies, hybrid cars, and electric cars have become popular in order to solve problems such as prevention of warming and carbon dioxide ($CO_2$) emission. To this end, aluminum, magnesium, and FRPs such as CFRPs (carbon fiber reinforced plastics) and GFRPs (glass fiber reinforced plastics) have become more and more used.

In conventional welding methods, welding between dissimilar materials, for example, between aluminum and iron is very difficult, and, for FRPs of glass fibers and carbon fibers, welding per se is impossible. Accordingly, a bonding method that can strongly bond these materials (adherends) is demanded. Methods using pressure-sensitive adhesive sheets or bonding sheets are adopted as methods for bonding between materials that cannot be bonded by welding and the like. These pressure-sensitive adhesive sheets and bonding sheets are required to realize bonding between metals, between a metal and an organic material, and between organic materials and to have an adhesion strength high enough to be used in structural use, no deterioration in adhesion strength when the temperature has changed, initial adhesiveness, no need to provide a preheating step and the like, good workability and the like.

A die attachment film having a dicing sheet function comprising a base material film, a pressure-sensitive adhesive layer, a base material film, and a film-shaped adhesive layer provided in that order has been proposed as the bonding sheet in Japanese Patent Application Laid-Open NO. 237483/2006 (patent document 1). Regarding the die attachment film, releasing treatment of the interface on the film-shaped adhesive layer side of the base material film and the use of a mixture of an acrylic ester copolymer with a heat curable resin as the film-shaped adhesive are disclosed. The film-shaped adhesive layer in this film has an initial adhesiveness in a temperature range of 15 to 60° C., but on the other hand, has a low adhesive force because the film-shaped adhesive layer is based on the premise that, after processing, the film-shaped adhesive layer is separated.

A metal foil-clad laminated plate is known from Japanese Patent Application Laid-Open No. 181421/1997 (Patent document 2). The metal foil-clad laminated plate is obtained by providing a release film having a heat-curable resin layer on its one side, superimposing a prepreg, obtained by impregnating a sheet-shaped base material with a heat-curable resin and drying the impregnated sheet-shaped base material, on the heat-curable resin layer side of the release film, subjecting the assembly to heat-pressing molding for integration to prepare a plate-like body, subjecting the plate-like body to desired fabrication, separating the release film, superimposing a metal foil on the heat-curable resin layer side, and subjecting the assembly to heat-pressing molding for integration. In the laminated plate production process, two heat curing steps are provided.

Regarding the adhesive sheets, heat-curable adhesive sheets having initial adhesiveness are also known. These adhesive sheets having initial adhesiveness generally comprise an adhesive layer of a heat curable resin to which a pressure-sensitive resin such as an acrylic resin has been added. The addition of the pressure-sensitive resin such as an acrylic resin to the heat-curable resin results in lowered adhesion strength. To overcome these problems, an adhesive sheet that has initial adhesiveness and can satisfy an adhesion strength of 15 to 20 MPa required in automobile applications has been desired.

PRIOR ART DOCUMENTS

Patent Documents

Patent document 1: Japanese Patent Application Laid-Open No. 237483/2006
Patent document 2: Japanese Patent Application Laid-Open No. 181421/1997

SUMMARY OF THE INVENTION

Problems to be Solved by the Invention

The present inventors have now found that, in an adhesive sheet comprising an adhesive that comprises an acrylic resin, an epoxy resin, and a curing agent, when the acrylic resin and the epoxy resin are contained at a predetermined ratio, the adhesive sheet advantageously has initial adhesiveness and can realize bonding between metals, between a metal and an organic material, and between organic materials, and can retain an excellent adhesion strength without undergoing a temperature change. The present invention has been made based on such finding.

Accordingly, an object of the present invention is to provide an adhesive sheet that has initial adhesiveness and can realize bonding between metals, between a metal and an organic material, and between organic materials, and can retain an excellent adhesion strength without undergoing a temperature change.

Another object of the present invention is to provide a method for bonding adherends using the adhesive sheet.

Means for Solving the Problems

Means for Solving the Problems

According to one aspect of the present invention, there is provided an adhesive sheet comprising a first release paper, an adhesive layer, and a second release paper stacked in that order, the adhesive layer containing an adhesive, the adhesive containing at least an acrylic resin, an epoxy resin, and a curing agent, the content of the epoxy resin being 175 to 300 parts by weight per 100 parts by weight of the acrylic resin.

In a preferred embodiment of the present invention, the adhesive layer further comprises a core impregnated with the adhesive.

In a preferred embodiment of the present invention, the adhesive has an islands-sea structure comprising sea formed of the acrylic resin and islands formed of the epoxy resin.

In a preferred embodiment of the present invention, the acrylic resin is an acrylic ester copolymer selected from the group consisting of ethyl acrylate-butyl acrylate-acrylonitrile copolymers, ethyl acrylate-acrylonitrile copolymers, and butyl acrylate-acrylonitrile copolymers.

In a preferred embodiment of the present invention, the polymer has, introduced thereinto, at least one functional group selected from a hydroxyl group, a carboxyl group, an epoxy group, or an amide group.

In a preferred embodiment of the present invention, the epoxy resin is a mixture of a nitrile butadiene rubber-modified epoxy resin with a bisphenol A epoxy resin.

In a preferred embodiment of the present invention, the content of the nitrile butadiene rubber-modified epoxy resin is 25 to 75 parts by weight per 100 parts by weight of the acrylic resin and the content of the bisphenol A epoxy resin is 150 to 225 parts by weight per 100 parts by weight of the acrylic resin.

In a preferred embodiment of the present invention, the curing agent is a dicyandiamide compound.

In a preferred embodiment of the present invention, the core is a woven fabric or a nonwoven fabric.

According to another aspect of the present invention, there is provided a laminated body comprising a first adherend and a second adherend bonded to each other through the above adhesive sheet, an epoxy resin layer being provided at an interface of the adhesive sheet and the first adherend and at an interface of the adhesive sheet and the second adherend, a three-dimensional islands-sea structure being provided between the epoxy resin layer on the first adherend side and the epoxy resin layer on the second adherend side, the islands-sea structure comprising sea formed of the acrylic resin and islands formed of the epoxy resin.

According to a still another aspect of the present invention, there is provided a method for bonding a first adherend to a second adherend with the above adhesive sheet, the method comprising:

separating and removing the first release paper and the second release paper from the adhesive sheet to expose the adhesive layer;

holding the adhesive layer between the first adherend and the second adherend and tentatively fixing the first adherend and the second adherend; and heating the adhesive layer to cure the adhesive layer and thus to bond the first adherend to the second adherend.

According to a further aspect of the present invention, there is provided a laminated body obtained by the above bonding method.

Effect of the Invention

According to the present invention, even before curing, the pressure-sensitive adhesive sheet has initial adhesiveness, and, thus, steps such as preheating in bonding adherents can be omitted. Further, the adhesive sheet contains an adhesive agent component formed of an epoxy resin and, thus, bonding between metals or between organic materials, as well as between a metal and an organic material, is possible. Furthermore, an adhesive containing an epoxy resin and an acrylic resin at a predetermined ratio is used, and, thus, adherends bonded to each other through the adhesive sheet can retain an excellent adhesion strength without undergoing a temperature change.

DETAILED DESCRIPTION OF THE INVENTION

Embodiments of the present invention will be described in more detail with reference to the accompanying drawings.

Figure 1:
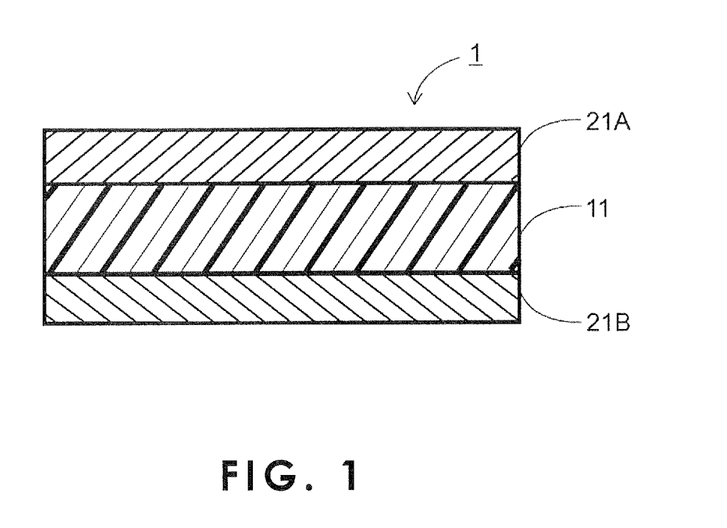
FIG. 1 is a schematic cross-sectional view of one embodiment of an adhesive sheet according to the present invention.
Figure 2:
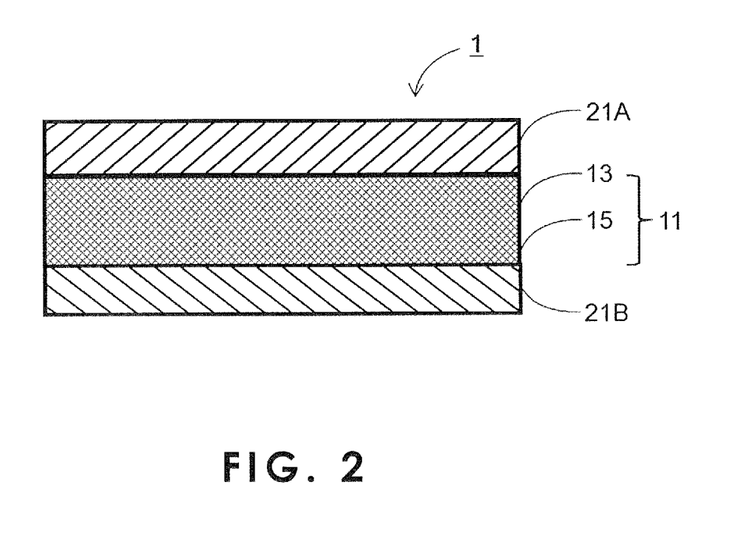
FIG. 2 is a schematic cross-sectional view of another embodiment of an adhesive sheet according to the present invention.

An adhesive sheet 1 according to the present invention, as shown in FIG. 1 has a construction comprising a first release paper 21A, an adhesive layer 11, and a second release paper 21B stacked in that order. The adhesive layer 11 comprises an adhesive 13 containing an acrylic resin, an epoxy resin, and a curing agent that will be described later. Further, in the present invention, as shown in FIG. 2, the adhesive layer 11 may comprise a core 15 impregnated with an adhesive 13. The adhesive usable in the present invention will be described.

<Adhesive>

The adhesive sheet according to the present invention comprises an adhesive containing at least an acrylic resin, an epoxy resin, and a curing agent. The content of the epoxy resin is 175 to 300 parts by weight per 100 parts by weight of the acrylic resin. In the present invention, the adhesive contains an acrylic resin having a pressure-sensitive adhesive property and an epoxy resin having adhesion mainly to adherends, and, thus, an adhesive sheet having both initial adhesiveness and adhesive properties can be realized. Since the acrylic resin and the epoxy resin are contained in the above-defined respective ranges, an excellent adhesion strength can be retained without undergoing a temperature change and, at the same time, low fragile properties, excellent shear strength, and high impact resistance and heat resistance can be realized. When the content of the epoxy resin is below the lower limit of the above-defined range, the adhesive force is so high that drawbacks occur including the occurrence of a failure when repositioning is necessary, lowered workability, and lowered adhesion to adherends. On the other hand, when the content of the epoxy resin is above the upper limit of the above-defined range, the adhesive properties are sacrificed and, at the same time, the adhesion to adherends is disadvantageously lowered. When a plurality of types of epoxy resins constitute the epoxy resin, the content of the epoxy resin is defined as the total content of the plurality of epoxy resins.

The acrylic resin is not particularly limited as long as it can be crosslinkingly reacted with the epoxy resin that will be described later. Examples of suitable acrylic resins include alkyl ester (meth)acrylates such as methyl (meth)acrylate, ethyl (meth)acrylate, propyl (meth)acrylate, isopropyl (meth)acrylate, n-butyl (meth)acrylate, i-butyl (meth)acrylate, t-butyl (meth)acrylate, n-hexyl (meth)acrylate, octyl (meth)acrylate, 2-ethylhexyl (meth)acrylate, and lauryl (meth)acrylate; and acrylic ester copolymers obtained by copolymerizing these acrylic ester monomers with functional group-containing monomers such as maleic acid, itaconic acid, 2-hydroxyethyl (meth)acrylate, 2-hydroxypropyl (meth)acrylate, (meth)acrylamide, N-methylolacrylamide, n-butoxy-N-methylolacrylamide, sodium 2-acrylamide-2-methyl-1-propanesulfonate, diacetone acrylamide, and glycidyl (meth)acrylate, or monomers such as styrene, vinyltoluene, vinyl acetate, (meth)acrylonitrile, vinyl chloride, vinylidene chloride, and ethyl vinyl ether.

Among the copolymers, ethyl acrylate-butyl acrylate-acrylonitrile copolymer, ethyl acrylate-acrylonitrile copolymer, or butyl acrylate-acrylonitrile copolymer is more preferred. These copolymers can improve dispersibility in the epoxy resin and coatability and film forming properties in the formation of the adhesive layer. Further, the initial adhesiveness of the adhesive layer can be ensured. In the present invention, among the acrylic ester copolymers, acrylic ester copolymers are particularly preferred in which at least one functional group selected from hydroxyl, carboxyl, epoxy, or amide groups is introduced, as a functional group crosslinkingly reactive with the epoxy resin, into the acrylic resin.

The weight average molecular weight of the acrylic ester copolymer is not particularly limited but is preferably 100000 or more, particularly preferably 150000 to 1000000. When the weight average molecular weight is in the above-defined range, the coatability of the adhesive layer 11 is improved. For coagulative force enhancement purposes, tackifier agents such as rosin resins, terpene resins, coumarone resins, phenol resins, and aliphatic or aromatic petroleum resins may be added.

The epoxy resin usable in the present invention means a resin obtained by using a prepolymer containing at least one epoxy group or glycidyl group in combination with a curing agent to cause a crosslinking polymerization reaction for curing. Such epoxy resins include: bisphenol-type epoxy resins such as bisphenol A epoxy resins and bisphenol F epoxy resins; novolak-type epoxy resins such as novolak epoxy resins, and cresol novolak epoxy resins; biphenyl epoxy-type resins, stilbene-type epoxy resins, triphenol methane-type epoxy resins, alkyl-modified triphenol methane-type epoxy resins, triazine neuclerus-containing epoxy resins, and dicyclopentadiene-modified phenol-type epoxy resins. Further examples thereof include novolak-type phenol resins such as phenol novolak resins, cresol novolak resins, and bisphenol A novolak resins, phenol resins such as resol phenol resins, triazine ring-containing resins such as urea resins and melamine resins, unsaturated polyester resins, bismaleimide resins, polyurethane resins, diallyl phthalate resins, silicone resins, benzoxazine ring-containing resins, and cyanate ester resins.

In the present invention, preferably, the epoxy resin comprises two types of epoxy resins, that is, a hard epoxy resin and a flexible epoxy resin. When the adhesive contains two types of epoxy resins, the cured adhesive can possess better fragile properties, excellent shear strength, and high impact strength and heat resistance. Here the term "hard" and the term "flexible" means that the two epoxy resins are different from each other in hardness and one epoxy resin used is harder than or more flexible than the other epoxy resin used.

The hard epoxy resin is preferably a crystalline epoxy resin, has, in its main chain, a rigid structure such as a biphenyl skeleton, a bisphenol skeleton, or a stilbene skeleton, and has a relatively low molecular weight. For example, bisphenol-type epoxy resins such as bisphenol A epoxy resins and bisphenol F epoxy resins are preferred, particularly bisphenol A epoxy resins, are preferred. The bisphenol A epoxy resins having 1 to 3 main chains are liquid at room temperature, and bisphenol A epoxy resins having 2 to 10 main chains are solid at room temperature. Among the epoxy resins, those that are crystallized and solid at room temperature, when heated to a temperature at or above the melting point, are rapidly melted and brought to a low-viscosity liquid. Accordingly, in the step of bonding the backside of the adherend to the adhesive portion of the adhesive layer 13, the epoxy resins can initially realize intimate contact and are further bonded to enhance the adhesion strength. The hard epoxy resin provides a high crosslinking density and thus is characterized by high mechanical strength, good chemical resistance, high curability, and low hygroscopy (small free volume).

Bisphenol A epoxy resins are preferred as the hard epoxy resin. The use of a plurality of types of different bisphenol A epoxy resins different from each other in hardness is further preferred. A plurality of types are, for example, bisphenol A epoxy resins different from each other in the number of main chains in the bisphenol skeleton which is a rigid structure. For example, a bisphenol A epoxy resin having 1 to 3 main chains may be used in combination with a bisphenol A epoxy resin having 2 to 10 main chains. The combined use of these bisphenol A epoxy resins can realize some flexibility while maintaining mechanical strength, leading to excellent adhesion. Mixing of solid epoxies can contribute to improved film forming properties. Different hardness means a relative difference in hardness. The presence of a difference in hardness, that is, the use of a first hard epoxy resin and a second hard epoxy resin having a higher hardness than the first hard epoxy resin, suffices for contemplated results. Specifically, JER828 manufactured by Japan Epoxy Resins is an example of a bisphenol A epoxy resin having 1 to 3 main chains, and JER1001 manufactured by Japan Epoxy Resins is an example of a bisphenol A epoxy resin having 2 to 10 main chains.

Epoxy resins that have been modified so as to contain a rubber component are preferred as the flexible epoxy resin. In particular, NBR (nitrile butadiene rubber) modified epoxy resins are preferred, because the NBR modified epoxy resins are less likely to cause a color change when they are heated. Further, the NBR modified epoxy resins can easily be mixed with crystalline epoxy resins that are hard epoxy resins. Specifically, examples thereof include EPR4030 manufactured by ADEKA Co., Ltd. The modified epoxy resins are conformable to a change in dimension by thermal expansion of the adherends and have improved heat resistance and excellent impact resistance and flexibility.

The content of the "flexible" epoxy resin and the content of the "hard" epoxy resin preferably meet the requirement that the content of the "hard" epoxy resin is larger than the content of the "flexible" epoxy resin. When the "flexible" epoxy resin and the "hard" epoxy resin are a nitrile butadiene rubber-modified epoxy resin and a bisphenol A epoxy resin, respectively, the content of the nitrile butadiene rubber-modified epoxy resin and the content of the bisphenol A epoxy resin in an adhesive are preferably 25 to 75 parts by weight per 100 parts by weight of the acrylic resin and 150 to 225 parts by weight per 100 parts by weight of the acrylic resin, respectively. When the content of the nitrile butadiene rubber-modified epoxy resin and the content of the bisphenol A epoxy resin are in the above-defined respective ranges, adhesive sheets having better shear strength, impact strength, heat resistance, and flexibility can be obtained.

Preferably, in the adhesive, the acrylic resin and the epoxy resin constitute an islands-sea structure comprising the acrylic resin as sea and the epoxy resin as islands. It is estimated that the acrylic resin (sea) and the epoxy resin (island) are crosslinked with each other and a plurality of types of epoxy resins constituting the epoxy resin are in a compatibilized state. It is estimated that, by virtue of the adoption of the mutually crosslinked islands-sea structure, the sea state of the acrylic resin develops the initial adhesiveness and the epoxy resin in the isoland state, when heated under pressure, is brought into contact and bonded to the adherends.

As described above, in the adhesive sheet, a three-dimensional islands-sea structure comprising the epoxy resin as the islands and the acrylic resin as the sea is formed. It has been found that, in the bonding of the first adherend to the second adherend through the adhesive sheet, the epoxy resin component in the adhesive is coagulated at the interface of the first adherend and the adhesive and at the interface of the second adherend and the pressure-sensitive adhesive to form a superficial acrylic resin component-free layer consisting of the epoxy resin only, and an islands-sea structure of the epoxy resin and the acrylic resin is formed between the epoxy resin layers. It is estimated that, when the adhesive sheet portion in the laminated body takes the above structure, the laminated body simultaneously possesses strong adhesive force derived from the epoxy resin and the flexibility and the thermal shock resistance derived from the islands-sea structure.

Preferably, epoxy resins are dispersed like islands in the acrylic resin (sea), and a certain distance (a few micrometers) are provided between islands so as to avoid contact between the islands from the viewpoints of avoiding an interface failure and maintaining a high level of adhesion strength. The formation of the islands-sea structure can be confirmed by the observation of a surface of the adhesive sheet under an electron microscope or the like.

Regarding the combination of the acrylic resin with the epoxy resin that can form the islands-sea structure, a good islands-sea structure is developed by using an ethyl acrylate-butyl acrylate-acrylonitrile copolymer, an ethyl acrylate-acrylonitrile copolymer, or a butyl acrylate-acrylonitrile copolymer as the acrylic resin, a bisphenol A epoxy resin as the hard epoxy resin, and a nitrile butadiene rubber-modified epoxy resin as the flexible epoxy resin.

A reaction between the acrylic resin and the epoxy resin is allowed to proceed by heating or the like to cure the adhesive. In the present invention, in order to accelerate the curing reaction, the adhesive contains a curing agent. Examples of such curing agents include: amine curing agents, for example, polyamine compounds including aliphatic polyamines such as diethylene triamine (DETA), triethylene tetramine (TETA), and metaxylylene diamine (MXDA), aromatic polyamines such as diaminodiphenylmethane (DDM), m-phenylenediamine (MPDA), and diaminodiphenylsulfone (DDS), dicyandiamide (DICY), and organic acid dihydrazide; acid anhydride curing agents, for example, alicyclic acid anhydrides (liquid acid anhydrides) such as hexahydrophthalic acid anhydride (HHPA) and methyltetrahydrophthalic acid anhydride (MTHPA), aromatic acid anhydride curing agents such as trimellitic acid anhydride (TMA), pyromellitic acid anhydride (PMDA), and benzophenonetetracarboxylic acid (BTDA); and phenol curing agents, for example, phenol resins. In particular, dicyandiamide (DICY) is preferred because DICY is a latent curing agent and thus possesses excellent storage stability and a long pot life of a few weeks even in storage at room temperature. Imidazoles may be incorporated as a curing accelerator.

The content of the curing agent in the adhesive is preferably 2 to 20 parts by weight per 175 to 300 parts of the content of the epoxy resin. When the mixing ratio of the curing agent is below the lower limit of the above-defined content range, the heat resistance after bonding is low and the adhesion strength is likely to undergo a temperature change. A curing agent content above the upper limit of the above-defined content range is advantageous in that, when the adhesive sheet is stored before use for bonding to the adherends, the storage stability (pot life) during the storage is lowered and, further, an unreacted curing agent remains unreacted even after curing, resulting in lowered adhesive force.

From the viewpoint of improving and modifying, for example, processability, heat resistance, weathering resistance, mechanical properties, dimensional stability, antioxidative properties, slipperiness, releasability, flame retardancy, antifungal properties, electrical characteristics, and strength, for example, lubricants, plasticizers, loading agents, fillers, antistatic agents, antiblocking agents, crosslinking agents, antioxidants, ultraviolet absorbers, photostabilizers, and coloring agents such as dyes and pigments may be further added to the adhesive. If necessary, the adhesive may further contain coupling agents such as silane, titanium, and aluminum coupling agents. The coupling agents can improve the adhsion between the resin and the adherends and between the resin and the core.

The adhesive used in the present invention may be prepared by mixing the above ingredients together and optionally performing kneading and dispersion. The mixing or dispersion method is not particularly limited, and conventional kneading and dispersing machines may be applied. Examples thereof include twin roll mills, triple roll mills, pebble mills, trommels, Szegvari attritors, high-speed impeller dispergators, high-speed stone mills, high-speed impact mills, Despar, high-speed mixers, ribbon blenders, cokneaders, intensive mixers, tumblers, blenders, dispersers, homogenizers, and ultrasonic dispergators. When a plurality of types of epoxy resins are used as the hard epoxy resin, a method is preferably adopted that comprises previously mixing these plurality of type of epoxy resins with stirring, then mixing the curing agent thereinto with stirring, diluting the mixture with a solvent, then mixing the flexible epoxy resin thereinto with stirring, and then mixing the acrylic resin thereinto with stirring.

<Adhesive Sheet>

The adhesive sheet according to the present invention has layer construction comprising an adhesive layer formed of the adhesive and first and second release papers provided on respective both surfaces of the adhesive layer. In the present invention, a first release paper 21A and a second release paper 21B are collectively called a release paper 21. As shown in FIG. 2, the adhesive layer may further comprise a core that may be impregnated with the adhesive. The core is preferably a woven fabric or a nonwoven fabric, and conventional various woven fabrics or nonwoven fabrics are usable. Examples thereof include woven fabrics or nonwoven fabrics formed of, for example, heat-resistant plastic fibers such as liquid crystal polymers, glass fibers, aramid fibers, and carbon fibers.

Figure 3:
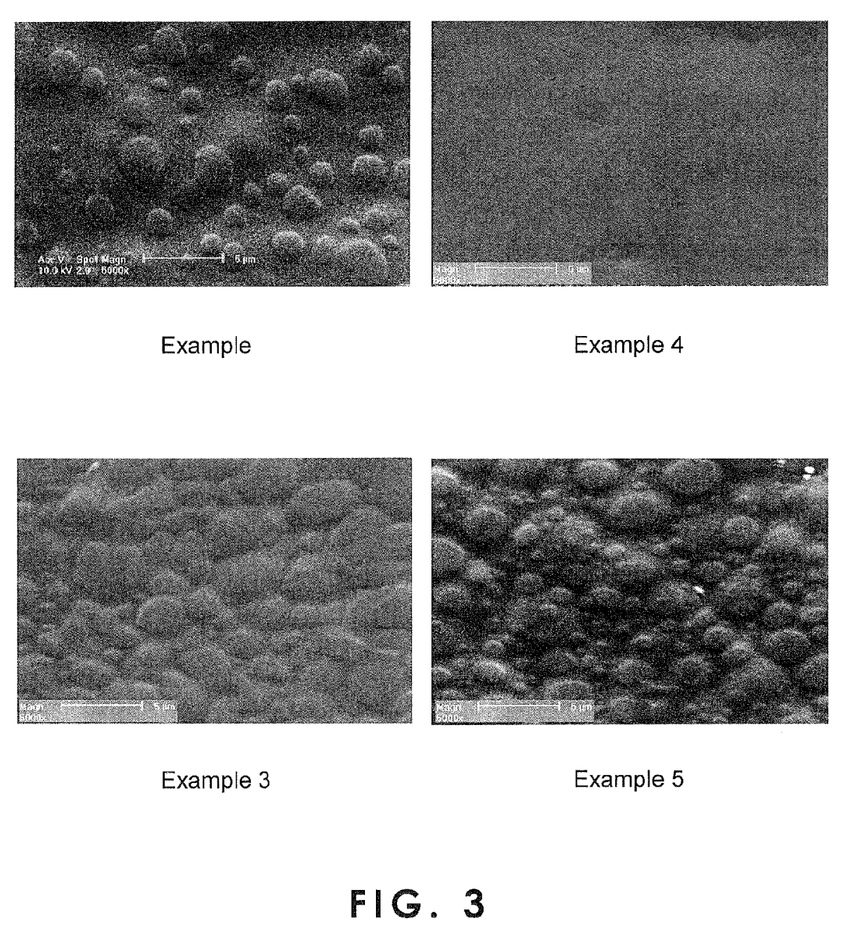
FIG. 3 is SEM photographs of the surface of adhesive sheets of Examples 2, 3, 4, and 5.

When the adhesive layer includes the core, as shown in FIG. 3, a coating machine is provided and a first release paper 21 and a core 15 which will be described later are travelled in a superimposed state. A composition of an adhesive 13 described above is coated on the surface of the core 15 to allow the composition to be impregnated into the core 15. After drying, a second release paper 21B is laminated onto the coated surface to obtain an adhesive sheet 1.

The adhesive may be coated on the release paper by any method without particular limitation, and examples thereof include roll coating, reverse roll coating, transfer roll coating, gravure coating, gravure reverse coating, Comma coating, rod coating, blade coating, bar coating, wire bar coating, die coating, lip coating, and dip coating. The composition is coated by the above coating method on a release face of the first release paper 21A or on a surface of the core 15 in such state that the first release paper 21A and the core 15 are superimposed on top of each other, and the coating is dried, followed by lamination of the second release paper 21B. The viscosity of the composition (coating liquid) is modified to about 1 to 20000 centistokes (25° C.), preferably 1 to 2000 centistokes. When the core 15 is impregnated with the composition (coating liquid), the viscosity is preferably lower and 1 to 1000 centistokes.

The first release paper 21A and the second release paper 21B may be the same or different. Conventional suitable papers such as release films, separate papers, separate films, separation papers, peel films, and peel papers are usable. Base materials for release papers, for example, wood-free papers, coated papers, impregnated papers, and plastic films, on one surace or both surfaces of which a release layer is formed may also be used. The release layer is not particularly limited as long as the release layer is formed of a releasable material. Examples of such materials include silicone resins, organic resin-modified silicone resins, fluoro resins, aminoalkyd resins, melamine resins, acrylic resins, and polyester resins. Any of emulsion-type, solvent-type, or solvent free-type resins may be used.

The release layer is formed by coating a coating liquid, prepared by dispersing and/or dissolving ingredients of the release layer, on one surface of a base material film for a release paper and heat-drying and/or curing the coating. The coating liquid may be coated by any conventional coating method. Examples of such coating methods include roll coating, gravure coating, and spray coating. If necessary, the release layer may be formed on a part or the whole area of at least one surface of the base material film.

The peel force of the first and second release papers is preferably about 1 to 2000 mN/cm, more preferably 100 to 1000 mN/cm against a pressure-sensitive adhesive tape. When the peel force of the release layer is less than 1 mN/cm, the peel force against a pressure-sensitive adhesive sheet or a pressure-sensitive adhesive material is so low that peeling or partial lifting occurs. On the other hand, when the peel force of the release layer is more than 2000 mN/cm, the peel force of the release layer is so high that peeling is difficult. Addition-type and/or polycondensation-type curable silicone resins for release papers that are composed mainly of polydimethylsiloxane are preferred from the viewpoints of stable releasability and processability, <Method for Bonding of Adherends>

In bonding to adherends, the first release paper 21A and the second release paper 21B in the adhesive sheet 1 are separated and removed to expose the adhesive layer 11. The exposed adhesive layer 11 is placed and held, by tackiness of the adhesive layer 11, between a first adherend and a second adherend that are the same or different. Subsequently, the assembly is heated or heated under pressure to cure the adhesive layer 11 to allow the first adherend and the second adherend to be strongly bonded to each other. Thus, the use of the adhesive sheet according to the present invention can allow adherends to be tentatively fixed to each other by taking advantage of initial adhesiveness and thereafter can allow the adhesive sheet to be heat-cured, for example, by a batch method to bond the adherends to each other. Accordingly, steps such as a preheating step can be omitted, contributing to significantly improved productivity.

Any adherends may be used without particular limitation, and examples thereof include metals, inorganic materials, organic materials, composite materials or laminated materials of combinations of these materials.

The heating temperature for curing is about 100 to 300° C., preferably 150 to 250° C. The heating time is 1 to 240 min, preferably 10 to 60 min. The adhesive layer 11 in the cured adhesive sheet 1 has initial adhesiveness. Accordingly, steps such as a preheating step can be omitted, and bonding work can be carried out in such a state that the adherends are held by adhesive force only, leading to good workability and low cost. Bonding between metals, between a metal and an organic material, and between an organic material and an organic material can be realized by properly selecting materials for the adhesive layer and the mixing ratio of the materials. Further, high adhesion strength derived from the epoxy resin can be obtained, and the adhesion strength is less likely to be deteriorated even when a temperature changes. The adhesive is less likely to be brittle by virtue of a property derived from the acrylic resin, and excellent shear strength and high impact strength and heat resistance can be provided. Thus, the adhesive sheet is usable for structural applications.

<Laminated Body>

The use of the adhesive sheet according to the present invention can realize strong bonding of FRPs of glass fibers or carbon fibers and materials (adherents) such as dissimilar metals in which difficulties have been encountered in conventional welding methods, and, for example, a laminated body between aluminum and a metal such as iron and a laminated body between FRPs or between CFRPs can be obtained. These laminated bodies can retain excellent adhesion strength without undergoing a temperature change, have low brittleness, excellent shear strength and high impact strength and heat resistance and can be utilized in the field of automobiles, airplanes, ships and the like.

EXAMPLES

The present invention is further illustrated by the following Examples that are not intended as a limitation of the invention. The content (parts) of ingredients of compositions used in the formation of each layer means parts by weight of solid matter excluding solvent.

Example 1

<Preparation of Adhesive Sheets>

The following ingredients were mixed together with a stirrer to prepare an adhesive.

| | |
|---|---|
| Acrylic ester (BA-EA-AN) copolymer resin (SG-P3 manufactured by Nagase ChemteX Corporation) | 100 parts |
| Bisphenol A epoxy resin (JER828 manufactured by Japan Epoxy Resins Co., Ltd.) | 50 parts |
| Bisphenol A epoxy resin (JER1001 manufactured by Japan Epoxy Resins Co., Ltd.) | 100 parts |
| NBR-modified epoxy resin (EPR4030 manufactured by ADEKA) | 50 parts |
| Dicyandiamide (DICY7 manufactured by Japan Epoxy Resins Co., Ltd.) | 7 parts |

The adhesive thus obtained was coated by a Comma coater on a surface of a core (BELX MBBK6FZSO manufactured by Kuraray Co., Ltd.) superimposed on a separation film (SP-PET 03BU manufactured by Tohcello Co., Ltd.) to a coverage of 100 g/m² to impregnate the core with the adhesive and thus to form an adhesive layer. A separation film (SP-PET 01BU manufactured by Tohcello Co., Ltd.) was laminated on the adhesive layer to prepare an adhesive sheet.

<Preparation of Laminated Body>

The adhesive sheet was cut into 25 mm×12.5 mm, and one of the separation films was separated to expose the adhesive layer, and the exposed surface was applied onto a front portion of CFRP (100 mm in length×25 mm in width×1.5 mm in thickness) one of adherends. The separation film was separated from the adhesive sheet applied to CFRP to expose the adhesive layer, and a front portion of CFRP (100 mm in length×25 mm in width×1.5 mm in thickness), the other adherend, was applied onto the adhesive layer portion. In this state, both the CFRPs were tentatively fixed.

Next, a load of 3 kg was applied onto the tentatively fixed adherends, and, in this state, the adhesive layer was heat-cured at 180° C. for one hr to obtain a laminated body.

Example 2

An adhesive sheet was obtained in the same manner as in Example 1, except that the core was not placed in the adhesive layer. A laminated body was obtained in the same manner as in Example 1, except that the adhesive sheet prepared just above was used.

Example 3

An adhesive sheet was prepared in the same manner as in Example 2, except that JER1004 (manufactured by Japan Epoxy Resins Co., Ltd.) was used instead of JER1001 as the bisphenol A epoxy resin. A laminated body was obtained in the same manner as in Example 2, except that the adhesive sheet prepared just above was used.

Example 4

An adhesive sheet was prepared in the same manner as in Example 2, except that YL7410 (manufactured by Japan Epoxy Resins Co., Ltd.) as a rubber elastic epoxy was used instead of EPR4030 as the NBR modified epoxy resin. A laminated body was obtained in the same manner as in Example 2, except that the adhesive sheet prepared just above was used.

Example 5

An adhesive sheet was prepared in the same manner as in Example 2, except that the following ingredients were mixed with a stirrer to prepare an adhesive. A laminated body was obtained in the same manner as in Example 2, except that the adhesive sheet prepared just above was used.

| | |
|---|---|
| Acrylic ester (BA-EA-AN) copolymer resin (SG-P3 manufactured by Nagase ChemteX Corporation) | 100 parts |
| Bisphenol A epoxy resin (JER828 manufactured by Japan Epoxy Resins Co., Ltd.) | 50 parts |
| NBR modified epoxy resin (EPR4030 manufactured by ADEKA) | 50 parts |
| Phenoxy resin (YP-50EK35 manufactured by Nippon Steel Chemical Co., Ltd.) | 100 parts |
| Dicyandiamide (DICY7 manufactured by Japan Epoxy Resins Co., Ltd.) | 7 parts |

Comparative Example 1

An adhesive sheet was prepared in the same manner as in Example 5, except that PVF-K (manufactured by Chisso Corp.) as polyvinyl formal was used instead of YP-50EK35 as the phenoxy resin. A laminated body was obtained in the same manner as in Example 5, except that the adhesive sheet prepared just above was used.

<Evaluation of Adhesion Strength>

For the laminated bodies obtained above, both ends were fixed to Tensilon (RTA-1T manufactured by Orientec Co. Ltd.) and was pulled at 0.5 mm/min to measure shear strength.

<Evaluation of Initial Adhesive Force>

Each adhesive sheet obtained above was allowed to stand in an atmosphere of 23° C. and 50% RH for 24 hr, was then cut into a size of 25 mm in width and 250 mm in length to prepare a specimen. One of the separation films was separated from the specimen to expose the adhesive layer, and the specimen was mounted on a cleaned glass plate so that the adhesive layer came into contact with the glass plate. An application load was applied with a manual application apparatus (JIS 0237). by one-time reciprocation at an application speed of about 5 mm/sec to apply specimen to the glass plate. The applied specimen was separated from one end with Tensilon (RTC1310A manufactured by Orientec Co. Ltd.) at a speed of 300 mm/min to measure stress at that time. The measured stress was regarded as the adhesive force.

TABLE 1

| Components of adhesive | | Example 1 | Example 2 | Example 3 | Example 4 | Example 5 | Comparative Example 1 |
|---|---|---|---|---|---|---|---|
| Acrylic resin | SG-P3 | 100 | 100 | 100 | 100 | 100 | 100 |
| Epoxy resin | JER828 | 50 | 50 | 50 | 50 | 50 | 50 |
| (hard) | JER1001 | 100 | 100 | — | 100 | — | — |
| | JER1004 | — | — | 100 | — | — | — |
| Epoxy resin | EPR4030 | 50 | 50 | 50 | — | 50 | 50 |
| (flexible) | YL7410 | — | — | — | 50 | — | — |
| Phenoxy resin | YP-50EK35 | — | — | — | — | 100 | — |
| Polyvinyl formal | PVF-K | — | — | — | — | — | 100 |
| Curing agent | DICY7 | 7 | 7 | 7 | 7 | 7 | 7 |
| Core | | Used | Not used | Not used | Not used | Not used | Not used |

TABLE 1-continued

| Components of adhesive | | Example 1 | Example 2 | Example 3 | Example 4 | Example 5 | Comparative Example 1 |
|---|---|---|---|---|---|---|---|
| Evaluation | Adhesion strength (MPa) | 20.0 | 25.0 | 21.4 | 11.6 | 15.6 | 4.7 |
| | Initial adhesive force (N/25 mm) | 15.0 | 15.0 | 14.0 | 20.0 | 14.0 | 10.0 |

<Surface Morphology of Adhesive Surface>

Figure 4:
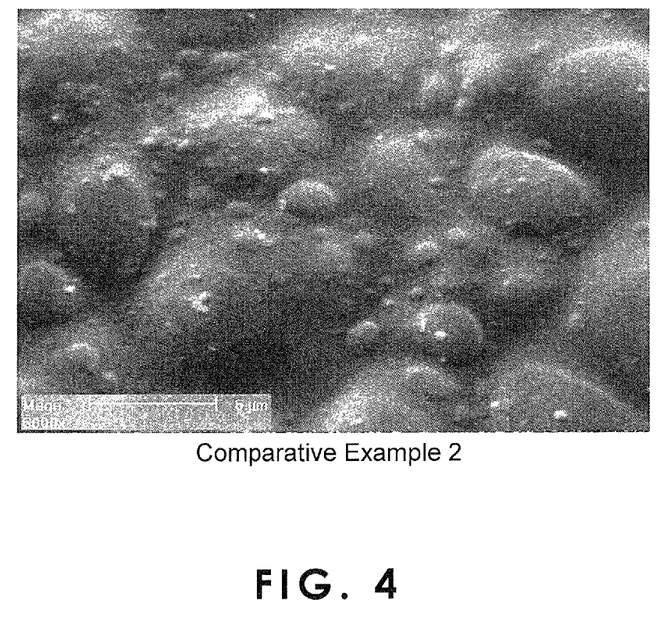
FIG. 4 is an SEM photograph of the surface of an adhesive sheet of Comparative Example 1.
Figure 5:
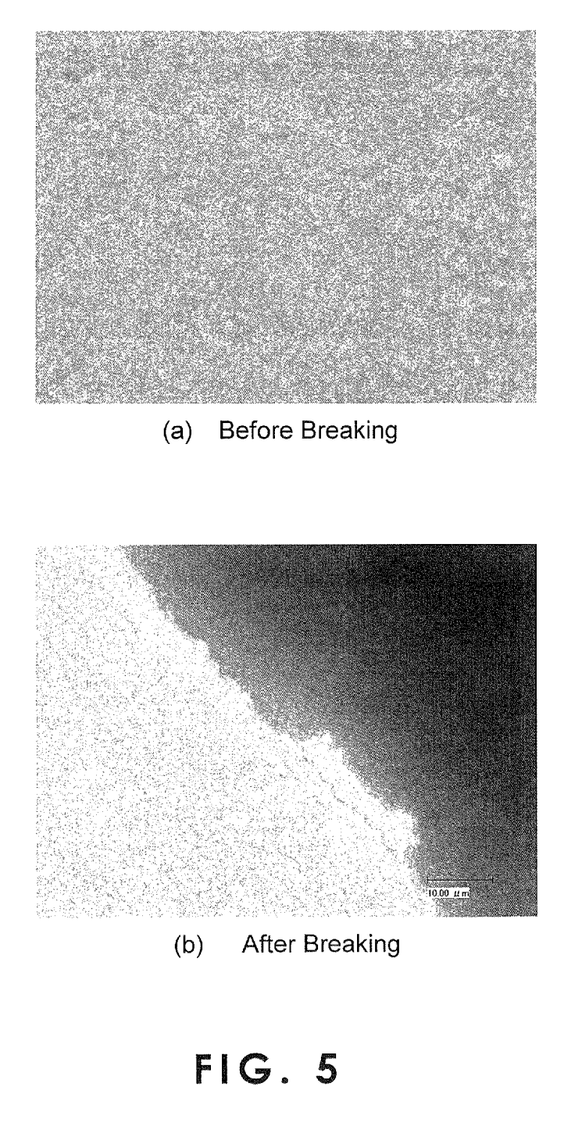
FIG. 5 is an optical microphotograph of a fracture surface of an adhesive layer of a laminated body of Example 1.

The surface of the adhesive layer before heat curing of the adhesive sheet of each of Examples 2, 3, 4, and 5 was observed under an electron microscope (S-3200N manufactured by Hitach-Hitec). The results of the observation were as shown in FIG. 3. Further, the surface of the adhesive layer before heat curing of the adhesive sheet of Comparative Example 1 was observed in the same manner as described just above. The results of the observation were as shown in FIG. 4. Furtther, in the laminated body of Example 1, the fracture surface of the adhesive layer after the measurement of the adhesion strength was observed under an optical microscope (VHX-600 manufactured by Keyence Corp.). The results of the observation were as shown in FIG. 5.

<Evaluation of Laminated Body>

At the outset, an ultrathin slice sample (thickness 80 nm) of a laminated body section was prepared with an ultramicrotome (ULTRACUT UC6 manufactured by JEOL Ltd.) from the adhesive (with a separation film applied to its surface) used in Example 2. A carbon was vapor-deposited on the surface of the ultrathin slice sample with a carbon coater (V-1000 manufactured by VACUUM DEVICE CO., LTD. The vapor-deposited ultrathin slice sample was subjected to osmium staining for 2 hr for use as a sample for STEM observation.

Next, a laminated body was prepared in the same manner as in Example 2, except that an aluminum plate, one surface of which had been planished and the other surface had been subjected to mat finishing, was used instead of CFRP. Specifically, the planished surface of the aluminum plate was allowed to face one surface of the adhesive sheet and the mat-finished surface of the aluminum plate was allowed to face the other surface of the adhesive sheet. An ultrathin slice sample (thickness 80 nm) of a laminated body section was prepared with an ultramicrotome (ULTRACUT UC6 manufactured by JEOL Ltd.) in such a state that the aluminum plate was tentatively fixed to the adhesive sheet (before curing). Carbon was vapor-deposited on the surface of the ultrathin slice sample with a carbon coater (V-1000 manufactured by VACUUM DEVICE INC.). The ultrathin slice sample thus obtained was subjected to osmium staining for 12 hr to prepare a sample for STEM observation.

An ultrathin slice sample was prepared in the same manner as described just above, except that the laminated body after curing of the adhesive was used. Carbon was vapor-deposited, and the vapor-deposited sample was subjected to ruthenium staining for 12 hr. After figuring, the sample was again subjected to ruthenium staining for 3 hr to prepare a sample for SEM observation.

Figure 6:
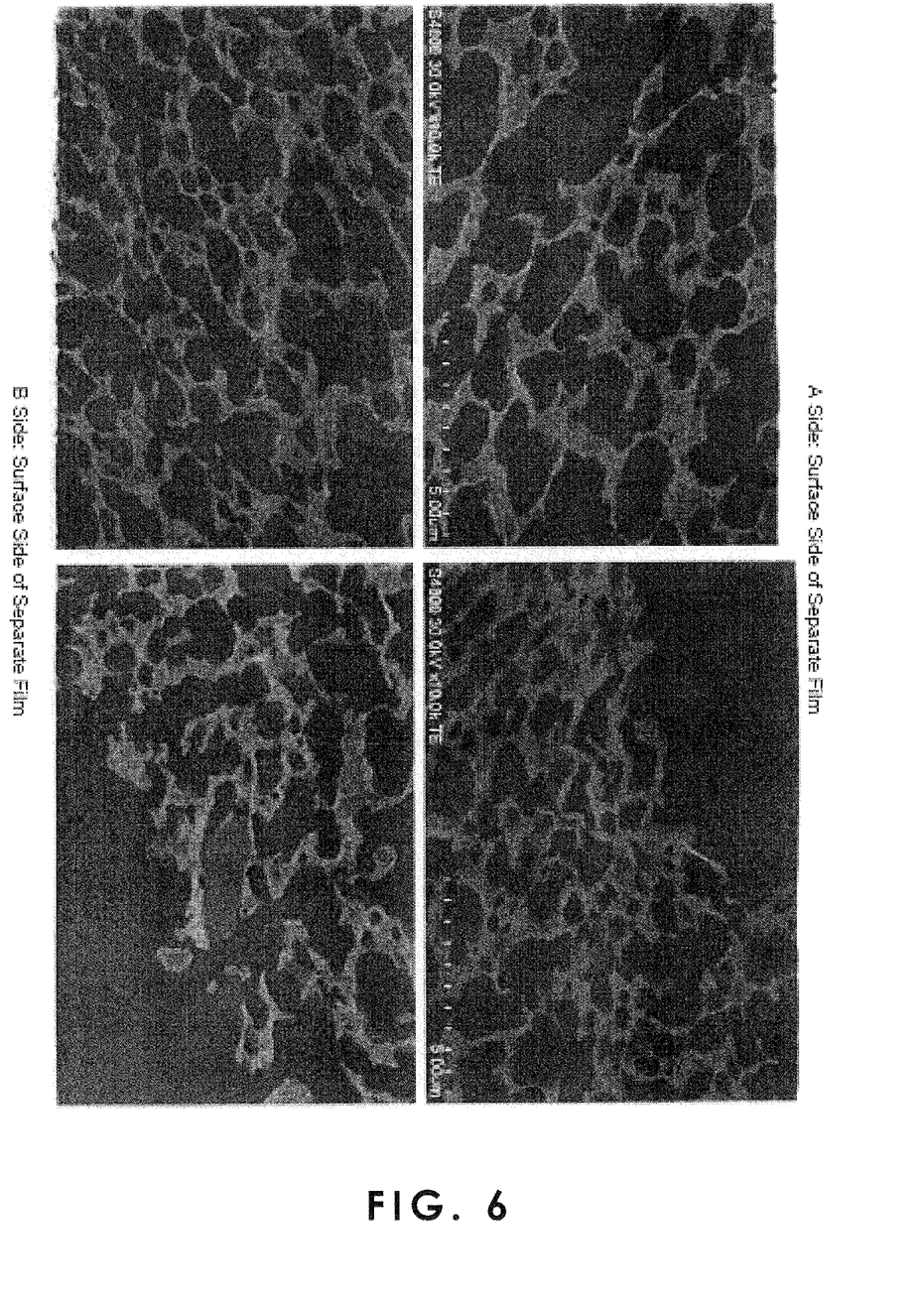
FIG. 6 is an STEM photograph of a cross section of an adhesive per se.

The above samples were observed under an electron microscope (S-4800 manufactured by Hitachi Hitec). FIG. 6 is an STEM photograph of the cross section of the adhesive per se. As can be seen from FIG. 6, an even islands-sea structure is formed over the whole adhesive in its thickness-wise direction. In the STEM photograph shown in FIG. 6, a white portion (sea portion) is formed of the acrylic resin, and a gray portion (island portion) is formed of the epoxy resin.

Figure 7:
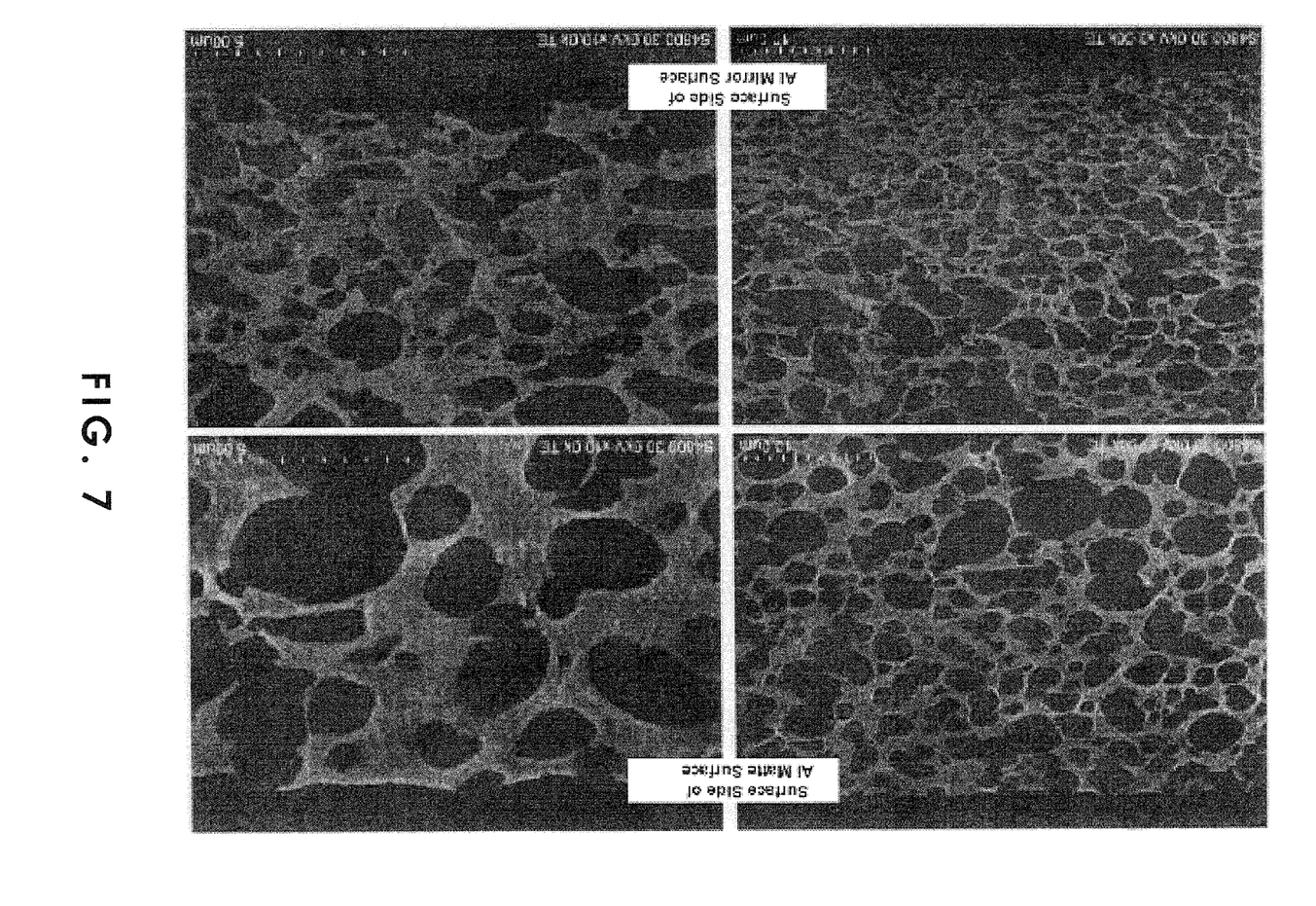
FIG. 7 is an STEM photograph of a cross section of a laminated body before curing of an adhesive.

FIG. 7 is an STEM photograph around the interface of the adhesive before curing and the aluminum plate. As can be seen from FIG. 7, an epoxy resin layer having a substantially even thickness is formed at the interface of the mat-finished surface of the aluminum plate and the adhesive layer and at the interface of the planished surface of the aluminum plate and the adhesive layer, and a three-dimensional islands-sea structure comprising the acrylic resin as sea and the epoxy resin as the islands is formed between the epoxy resin layers.

Figure 8:
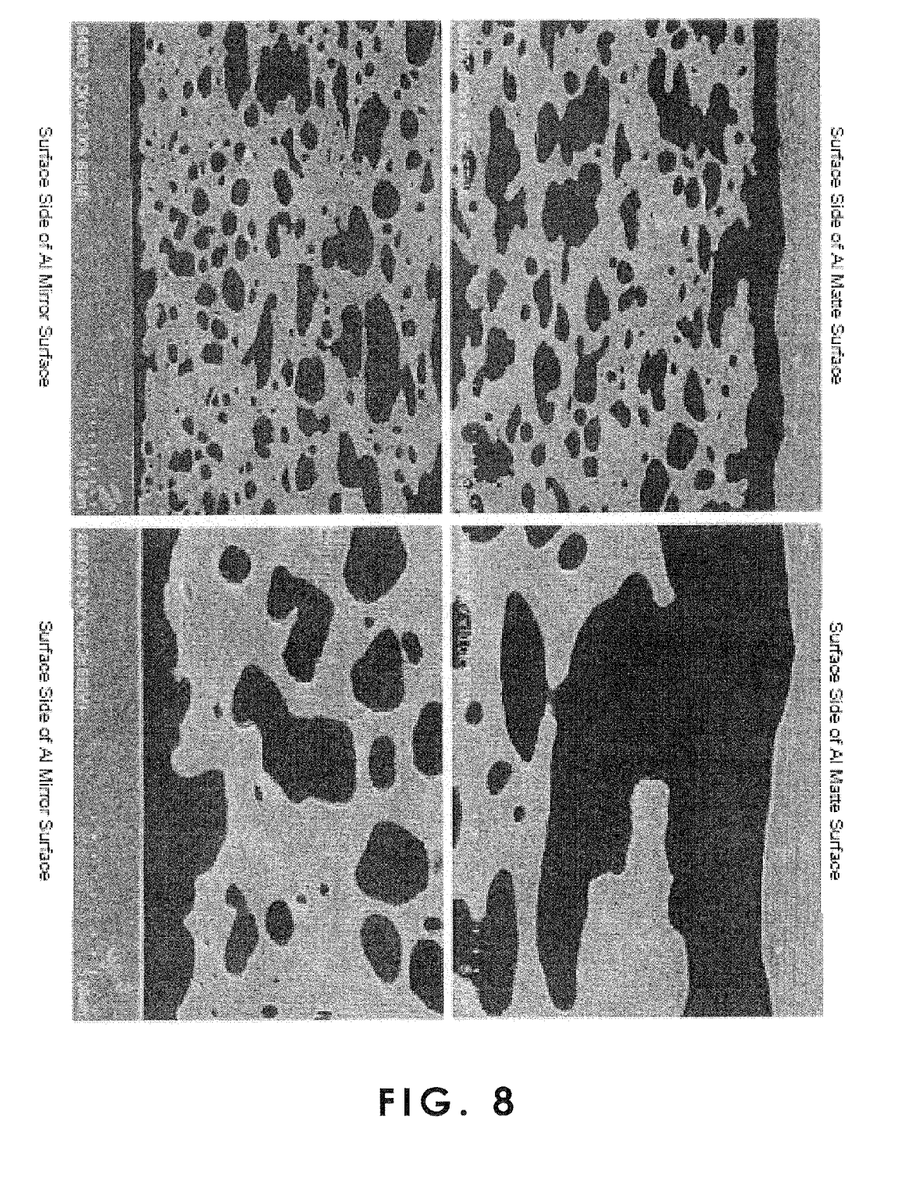
FIG. 8 is an SEM photograph of a cross section of a laminated body before curing of an adhesive.

FIG. 8 is an SEM photograph around the interface between the adhesive after curing and the aluminum plate. As can be seen from FIG. 8, even after the curing of the adhesive, an epoxy resin layer having a substantially even thickness is formed at the interface of the mat-finished surface of the aluminum plate and the adhesive layer and at the interface of the planished surface of the aluminum plate and the adhesive layer, and a three-dimensional islands-sea structure comprising the acrylic resin as sea and the epoxy resin as the islands is formed between the epoxy resin layers.

DESCRIPTION OF REFERENCE CHARACTERS

1: adhesive sheet
11: adhesive layer
13: adhesive
15: core
21: release paper
21A: first release paper
21B: second release paper

The invention claimed is:

1. An adhesive sheet comprising: a first release paper, an adhesive layer, and a second release paper stacked in that order,
   the adhesive layer containing an adhesive,
   the adhesive containing at least an acrylic resin, an epoxy resin, and a curing agent,
   the content of the epoxy resin being 175 to 300 parts by weight per 100 parts by weight of the acrylic resin, wherein the epoxy resin is a mixture of a nitrile butadiene rubber-modified epoxy resin with a bisphenol A epoxy resin, and wherein the acrylic resin is an acrylic ester copolymer selected from the group consisting of ethyl acrylate-butyl acrylate-acrylonitrile copolymers, ethyl acrylate-acrylonitrile copolymers and butyl acrylate-acrylonitrile copolymers,
   wherein when a laminated body is prepared by laminating two carbon fiber reinfored plastic sheets of 100 mm in length ×25 mm in width ×1.5 mm in thickness via the adhesive layer of 12.5 mm in length ×25 mm in width and curing the adhesive layer at 180° C. for one hour while applying a load of 3 kg onto the laminated body, the adhesion strength thereof is more than 12 MPa wherein the adhesive has a three-dimensional islands-sea structure comprising sea formed of the acrylic resin and islands formed of the epoxy resin.

2. The adhesive sheet according to claim 1, wherein the adhesive layer further comprises a core impregnated with the adhesive.

3. The adhesive sheet according to claim 2, wherein the core is a woven fabric or an nonwoven fabric.

4. The adhesive sheet according to claim 1, wherein the acrylic ester copolymer has, introduced thereinto, at least one functional group selected from a hydroxyl group, a carboxyl group, an epoxy group, or an amide group.

5. The adhesive sheet according to claim 1, wherein the content of the nitrile butadiene rubber-modified epoxy resin is 26 to 75 parts by weight per 100 parts by weight of the acrylic resin and the content of the bisphenol A epoxy resin is 150 to 225 parts by weight per 100 parts by weight of the acrylic resin.

6. The adhesive sheet according to claim 1, wherein the curing agent is a dicyandiamide compound.

7. An laminated body comprising a first adherend and a second adherend bonded to each other through an adhesive sheet according to claim 1, an epoxy resin layer being provided at an interface of the adhesive sheet and the first adherend and at an interface of the adhesive sheet and the second adherend, the three-dimensional islands-sea structure being provided between the epoxy resin layer on the first adherend side and the epoxy resin layer on the second adherend side, the islands-sea structure comprising sea formed of the acrylic resin and islands formed of the epoxy resin.

8. A method for bonding a first adherend to a second adherend with an adhesive sheet according to claim 1, the method comprising:

separating and removing the first release paper and the second release paper from the adhesive sheet to expose the adhesive layer;

holding the adhesive layer between the first adherend and the second adherend and tentatively fixing the first adherend and the second adherend; and heating the adhesive layer to cure the adhesive layer and thus to bond the first adherend to the second adherend.

9. A laminated body obtained by a method according to claim 8.

10. A laminated body comprising:

a first adherend bonded to a second adherend through an adhesive layer comprising at least an acrylic resin, an epoxy resin and a curing agent, the content of the epoxy resin being 175 to 300 parts by weight per 100 parts by weight of the acrylic resin wherein the epoxy resin is a mixture of a nitrile butadiene rubber-modified epoxy resin with a bisphenol A epoxy resin, and wherein the acrylic resin is an acrylic ester copolymer selected from the group consisting of ethyl acrylate-butyl acrylate-acrylonitrile copolymers, ethyl acrylate-acrylonitrile copolymers and butyl acrylate-acrylonitrile copolymers, wherein when a laminated body is prepared by laminating two carbon fiber reinforced plastic sheets of 100 mm in length ×25 mm in width ×1.5 mm in thickness via the adhesive layer of 12.5 mm in length ×25 mm in width and curing the adhesive layer at 180° C. for one hour while applying a load of 3 kg onto the laminated body, the adhesion strength thereof is more than 12 MPa, wherein the adhesive has a three-dimensional islands-sea structure comprising sea formed of the acrylic resin and islands formed of the epoxy resin, wherein the laminated body is produced by preparing the adhesive layer, bonding the first adherend to the second adherend through the adhesive layer, and curing the adhesive layer.

* * * * *